(12) United States Patent
Hicks et al.

(10) Patent No.: US 10,850,930 B1
(45) Date of Patent: Dec. 1, 2020

(54) PRODUCT DIVERTER FOR A RECIPROCALLY MOVABLE CONVEYING DEVICE

(71) Applicant: Key Technology, Inc., Walla Walla, WA (US)

(72) Inventors: Thaddeus Hicks, Walla Walla, WA (US); Peter Todd Jones, Walla Walla, WA (US); Willem (Wout) Jan Arentsen, Maurik (NL); Paul Daalmeijer, Renswoude (NL)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 16/452,718

(22) Filed: Jun. 26, 2019

(51) Int. Cl.
*B65G 47/76* (2006.01)
*B65G 27/04* (2006.01)
*B65G 27/00* (2006.01)

(52) U.S. Cl.
CPC .......... *B65G 47/766* (2013.01); *B65G 27/00* (2013.01); *B65G 27/04* (2013.01); *B65G 2812/0344* (2013.01)

(58) Field of Classification Search
CPC ...... B65G 27/00; B65G 27/04; B65G 47/766; B65G 2812/0344
See application file for complete search history.

(56) References Cited

U.S. PATENT DOCUMENTS

| | | | | |
|---|---|---|---|---|
| 2,987,064 A | * | 6/1961 | Peters | A24C 5/393 131/327 |
| 5,249,859 A | * | 10/1993 | Krynock | B01F 11/0077 198/771 |
| 5,787,679 A | * | 8/1998 | Lynch | B65G 47/766 198/367 |
| 6,460,680 B1 | * | 10/2002 | Hufford | B65G 27/04 198/367 |
| 9,254,965 B2 | * | 2/2016 | Groenewald | B65G 27/04 |
| 2009/0260951 A1 | * | 10/2009 | Groenewald | B65G 47/248 198/411 |

\* cited by examiner

*Primary Examiner* — Gene O Crawford
*Assistant Examiner* — Keith R Campbell
(74) *Attorney, Agent, or Firm* — Randall Danskin P.S.

(57) ABSTRACT

An automated product diverter for a reciprocally movable conveying device generally provides a stationary base; a reciprocally movable conveyor bed supported by the stationary base; a product diverter that moves in an arc along a product transporting surface of the reciprocally movable conveyor, and an actuator carried by the stationary base and which operatively communicates with the diverter arm, and the reciprocal movement of the conveyor bed and the diverter arm is isolated from the actuator carried by the stationary base.

20 Claims, 9 Drawing Sheets

PRODUCT DIVERTER FOR A RECIPROCALLY MOVABLE CONVEYING DEVICE

TECHNICAL FIELD

The present invention relates to conveying devices, and more particularly to an automated product diverter for a reciprocally movable conveyor which operatively diverts product moving along a product transporting surface to a desired course of travel, and the reciprocal vibrating motion of the product transporting surface arm is operationally isolated from an actuator which controls and moves the product diverter.

BACKGROUND OF THE INVENTION

Various conveying arrangements and devices have been employed through the years for movement of a product along a product transporting surface from a first point to a second point. Such conveying arrangements and devices are typically either an endless belt moving around plural axially aligned rollers, or reciprocally movable beds that vibrate/oscillate at a desired frequency so as to cause desired movement of the product from the first point to the second point. In the employment of such conveying arrangements and devices it is sometimes desirable to divert all, or a portion of, the product moving therealong to only a portion of the product transporting surface. Various configurations of diverter arms, have been employed to accomplish this task.

Known diverter arms for endless belt conveyors are positioned adjacent above the moving conveyor belt so as to allow the conveyor belt to move thereunder, and the diverter arm is physically separated from the moving endless belt. Such diverter arms that are physically separated and spaced apart from the product transporting surface have various known drawbacks, including, but not limited to the drawback that the space between a bottom edge of the diverter arm and the moving conveyor bed provides a space in which product may be trapped/wedged and thereafter be "smeared" across and along the moving conveyor belt leading to product contamination and product damage.

Diverter arms for vibrating reciprocally movable conveyor beds can similarly be spaced above/apart from the product transporting surface but such separation requires independent mounting and supporting means for the diverter arm so that the diverter arm does not move/vibrate in conjunction with the product transporting surface. Such separation however, similarly leads to products being trapped/wedged/caught in the "space" and product's smearing/destruction. Alternatively, diverter arms for reciprocally movable conveyor beds may be physically and directly interconnected to the product transporting surface and move/vibrate in conjunction with the product transporting surface, in which case the "space" between the bottom edge of the diverter arm and the product transporting surface is eliminated to resolve the drawbacks known to be caused thereby. However, in such devices the vibrational motion of the conveyor bed is communicated/transferred to the diverter arm so the diverter arm moves in unison with the conveyor bed. As a result, diverter arms for reciprocally movable conveying devices have tended to be manual, and/or statically positioned by an operator in a desired orientation, and then thereafter manually moved by the operator to a second desired orientation when necessary. Automated movement of such diverter arms has proven problematic because the reciprocal vibration of the conveyor bed and diverter arm is conducted/transmitted to the automated moving means which causes exacerbated wear and tear thereon.

There has been a long desired need for an automated diverter arm for a reciprocally movable conveyor bed. The invention described herein, satisfies this long desired need.

An automated product diverter for a reciprocally movable conveying device which operates in the manner, as described, is the subject matter of the present device.

SUMMARY OF THE INVENTION

An automated product diverter for a reciprocally movable conveying device generally provides a stationary base; a reciprocally movable conveyor bed supported by the stationary base; a product diverter that moves in an arc along a product transporting surface of the reciprocally movable conveyor bed and an actuator carried by the stationary base and which operatively communicates with the diverter arm, and the reciprocal movement of the conveyor bed and the diverter arm is isolated from the actuator carried by the stationary base.

A first aspect of the present invention is an automated product diverter for a reciprocally movable conveying device having a stationary base, and a reciprocally movable conveyor bed having a product transporting surface with an upstream product receiving end and a downstream product discharge end, the product diverter comprising: an actuator interconnected to the stationary base and having a rotatable actuator shaft carrying a lower diverter arm that defines a yoke that further defines a medial space; an axially rotatable diverter arm pivot shaft is carried by the reciprocally movable conveyor bed and an upper end portion of the diverter arm pivot shaft extends vertically above the product transporting surface and a lower end portion of the diverter arm pivot shaft is vertically below the product transporting surface and the lower end portion of the diverter arm pivot shaft carries an upper diverter arm which further has a paddle at an end portion opposite the diverter arm pivot shaft and the paddle is positioned within the medial space defined by the yoke, and an air gap is substantially maintained between side portions of the paddle and the yoke; a diverter arm is interconnected with and extends radially upstream from the diverter arm pivot shaft that is above the product transporting surface and the diverter arm has a first end portion and a second end portion, a first side and a second side, a top edge and a bottom edge and a pneumatic puck is carried by a puck bracket on the top edge adjacent the second end portion and the diverter arm moves in an arc between a first position and a second position as the diverter arm pivot shaft axially rotates; a diverter bridge that extends transversely across the reciprocally movable conveyor bed spacedly above the product transporting surface and upstream of the diverter arm pivot shaft, the diverter bridge having first and second end portions that are interconnected to the reciprocally movable conveyor bed and defines a puck track for the pneumatic puck to move along as the diverter arm moves between the first position and the second position; and a pneumatic source communicating with the pneumatic puck, that when actuated positionally secures the diverter arm relative to the product transporting surface; and the lower diverter arm and the upper diverter arm are isolated from one another by the air gaps so that the reciprocal movement of the conveyor bed is not communicated to the lower diverter arm.

A further aspect of the present invention is an automated product diverter further comprising a pivot shaft support that is interconnected with the second upper end portion of the diverter arm pivot shaft and interconnected with an upper edge portion of a vertical support that is fixedly attached to the product supporting surface of the reciprocally movable conveyor bed downstream of the diverter arm pivot shaft.

A further aspect of the present invention is a product diverter and further comprising a positionally adjustable bumper carried on each spaced apart side of the yoke, and each adjustable bumper provides a means to adjust size of the air-gap between each bumper and the paddle carried by an upper diverter arm.

A further aspect of the present invention is a product diverter and further comprising a pivot bridge having a first end portion and a spaced apart second end portion, a top portion and an opposing bottom portion, an upstream edge and a downstream edge, the pivot bridge further has a pivot axle support post between the first end portion and the second end portion to carry a pivot shaft support that communicates with the upper end portion of the diverter arm pivot shaft, and the pivot bridge has a diverter vane adjacent downstream to the diverter arm pivot shaft that extends radially from the downstream edge of the pivot bridge generally along a longitudinal axis of the product transporting surface, and the pivot bridge is interconnected at the first end portion and at the second end portion with spaced upstanding sidewalls of the reciprocally movable conveyor bed.

A further aspect of the present invention is a product diverter and further comprising a track is defined in the top edge of the diverter arm to carry a pneumatic line that pneumatically communicates between the pneumatic source and the pneumatic puck.

A further aspect of the present invention is a product diverter and further comprising a frog carried by the reciprocally movable conveyor bed on an upstanding side wall thereof proximate above the product transporting surface to operatively cooperate with the second end portion of the diverter arm when the second end portion of the diverter arm is adjacent the frog.

A further aspect of the present invention is a product diverter and further comprising a bushing and a bushing support fixedly secured to an underside of the reciprocally movable conveyor bed and the diverter arm pivot shaft extends therethrough and is rotatably supported by the bushing and the bushing support.

A further aspect of the present invention is a product diverter and wherein the yoke further defines a medial space bounded by a first side of the yoke, a spaced apart second side of the yoke and a yoke base; and the first side of the yoke and the second side of the yoke each carry a positionally adjustable bumper to adjust size of the air-gap between each bumper and the paddle.

A further aspect of the present invention is a product diverter and wherein the actuator is fixedly attached to the stationary base of the product moving apparatus with an actuator mounting bracket.

A further aspect of the present invention is a product diverter and wherein the first end portion of the upper diverter arm is vertically offset from the second end portion of the upper diverter arm.

A further aspect of the present invention is a product diverter and wherein the pneumatic puck has a top surface, a bottom surface and an outwardly facing edge portion and the pneumatic puck changes configuration responsive to receiving pneumatic pressure from the pneumatic source.

A further aspect of the present invention is a product diverter and further comprising a cylinder piston operatively communicating with the pneumatic puck that is partially extended from the pneumatic puck responsive to the pneumatic puck receiving pneumatic pressure from the pneumatic source.

A further aspect of the present invention is a product diverter and wherein responsive to a signal received from a controller, the diverter arm pivots to either a first position which directs product moving along the product transporting surface to a first course of travel, or the diverter arm pivots to a second position which directs product moving along the product transporting surface to a second course of travel, or the diverter arm is pivoted to a third position which directs product moving along the product transporting surface to both the first course of travel and the second course of travel.

A further aspect of the present invention is a product diverter for a product moving apparatus having a stationary base, and a reciprocally movable conveyor bed having a product transporting surface with an upstream product receiving end and a downstream product discharge end, the product diverter comprising: an actuator releasably fixedly attached to the stationary base of the product moving apparatus by an actuator mounting bracket, the actuator having a rotatable actuator shaft carrying a lower diverter arm that extends radially from the rotatable actuator shaft, the lower diverter arm having a first end portion that is connected to the rotatable actuator shaft and a spaced apart second end portion that defines a yoke that further defines a medial space bounded by a first side of the yoke, a spaced apart second side of the yoke and a yoke base, the first side of the yoke and the second side of the yoke each carrying a positionally adjustable bumper to adjust size of an air-gap between each bumper and a paddle carried by an upper diverter arm; the upper diverter arm has a first end portion and a spaced apart second end portion, and the second end portion is vertically offset from the first end portion, and the first end portion of the upper diverter arm is releasably fixedly interconnected to a diverter arm pivot shaft that is axially rotatably carried by a bushing and a bushing support that is fixedly secured to an underside of the reciprocally movable conveyor bed, and the diverter arm pivot shaft extends through the reciprocally movable conveyor bed so that a second upper end portion of the diverter arm pivot shaft, opposite the upper diverter arm extends through and is spacedly vertically above the product transporting surface of the reciprocally movable conveyor bed; the paddle is structurally interconnected to the second end portion of the upper diverter arm and has a generally planar first side and a generally planar second side and defines a peripheral edge extending thereabout and the paddle extends vertically downwardly from the second end of the upper diverter arm opposite the reciprocally movable conveyor bed so that the paddle is positioned within the medial space defined by the yoke and an air gap is maintained between each planar side, of the paddle and each bumper carried by the lower diverter arm yoke; a pivot shaft support is interconnected with the second upper end portion of the diverter arm pivot shaft and with an upper edge portion of a vertical support that is fixedly attached to the product supporting surface of the reciprocally movable conveyor bed downstream of the diverter arm pivot shaft; a diverter arm is structurally interconnected with, and extends radially upstream from, an outwardly facing circumferential surface of the diverter arm pivot shaft that extends above the product transporting surface of the reciprocally movable conveyor bed, and the diverter arm has a first end portion that is structurally interconnected to the outwardly facing circumferential surface of the diverter pivot arm shaft and a spaced apart second end portion that extends upstream therefrom, and the diverter arm further has a first lateral side and an opposing second lateral side, a top edge and a bottom edge and a track is defined in the top edge of the diverter arm to carry a pneumatic line that pneumatically communicates between a pneumatic source and a pneumatic puck that is carried by a puck bracket on the top edge of the diverter arm adjacent the second end portion, and the pneumatic puck has a top surface, a bottom surface and an outwardly facing edge portion and the diverter arm moves in an arc of travel between a first position and a second position as the diverter arm pivot shaft axially rotates responsive to actuation of the actuator; a diverter bridge that extends transversely across the reciprocally movable conveyor bed and is spacedly above the product transporting surface upstream of the diverter arm pivot shaft and adjacent above the second end portion of the diverter arm as the diverter arm moves in an arc between the first position and the second position, the diverter bridge having a first end portion that is fixedly connected to one upstanding sidewall of the reciprocally movable conveyor bed with a conveyor bed connector, and a second end portion that is fixedly connected to a second upstanding sidewall of the reciprocally movable conveyor bed with a conveyor bed connector, the diverter bridge further having a top portion and a bottom portion defining a puck track, an upstream edge and a downstream edge, and the pneumatic puck carried at the second end portion of the diverter arm movably engages with the puck track defined in the bottom portion of the diverter bridge as the diverter arm moves between the first position adjacent one upstanding sidewall of the reciprocally movable conveyor bed and the second position adjacent a second upstanding sidewall of the reciprocally movable conveyor bed responsive to axial rotation of the actuator shaft of the actuator and axial rotation of the diverter am pivot shaft; and the diverter arm is positionally secured in the first position relative to the product transporting surface or in the second position relative to the product transporting surface by actuation of the pneumatic source which communicates with the pneumatic puck which responsively causes the pneumatic puck to change configuration and cause a cylinder piston to positionally secure the diverter arm relative to the diverter bridge and the product transporting surface of the reciprocally movable conveyor bed; and the lower diverter arm and the upper diverter arm are isolated from one another by the air gaps so that the reciprocal movement of the conveyor bed is not communicated to the lower diverter arm.

A further aspect of the present invention is a product diverter and further comprising a pivot bridge having a first end portion and a spaced apart second end portion, a top portion and an opposing bottom portion, an upstream edge and a downstream edge, the pivot bridge further has a pivot axle support post between the first end portion and the second end portion to carry a pivot shaft support that communicates with the upper end portion of the diverter arm pivot shaft, and the pivot bridge has a diverter vane adjacent downstream to the diverter arm pivot shaft that extends outwardly from the downstream edge of the pivot bridge generally along a longitudinal axis of the product transporting surface, and the pivot bridge is interconnected at the first end portion and at the second end portion with spaced upstanding sidewalls of the reciprocally movable conveyor bed.

A further aspect of the present invention is a product diverter and wherein a pivot shaft support is spacedly above the product transporting surface of the reciprocally movable conveyor bed, and the pivot shaft support is carried on the pivot bridge that is spacedly above and extends transversely across product transporting surface of the reciprocally movable conveyor bed.

An even still further aspect of the present invention is an automated product diverter for a reciprocally movable conveying device comprising; a stationary base; a reciprocally movable conveyor bed supported by the stationary base, the reciprocally movable conveyor bed having a product transporting surface with an upstream product receiving end and a downstream product discharge end, and two spaced apart upstanding sidewalls; a diverter arm having a first end portion and a second end portion and that is pivotally attached to the reciprocally movable conveyor bed by a vertically extending pivot shaft axle that extends through the product transporting surface and which interconnects with the first end portion of the diverter arm, and the second end portion of the diverter arm is positionally movable along the product transporting surface in an arc of travel between the two spaced apart upstanding sidewalls, and the reciprocal movement of the conveyor bed is communicated to the diverter arm; an actuator carried by the stationary base that operatively communicates with the pivot shaft axle to operatively pivot the diverter arm in the arc of travel; and the actuator is isolated from the reciprocal movement of the diverter arm so that the actuator does not reciprocally move responsive the diverter arm or conveyor bed.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
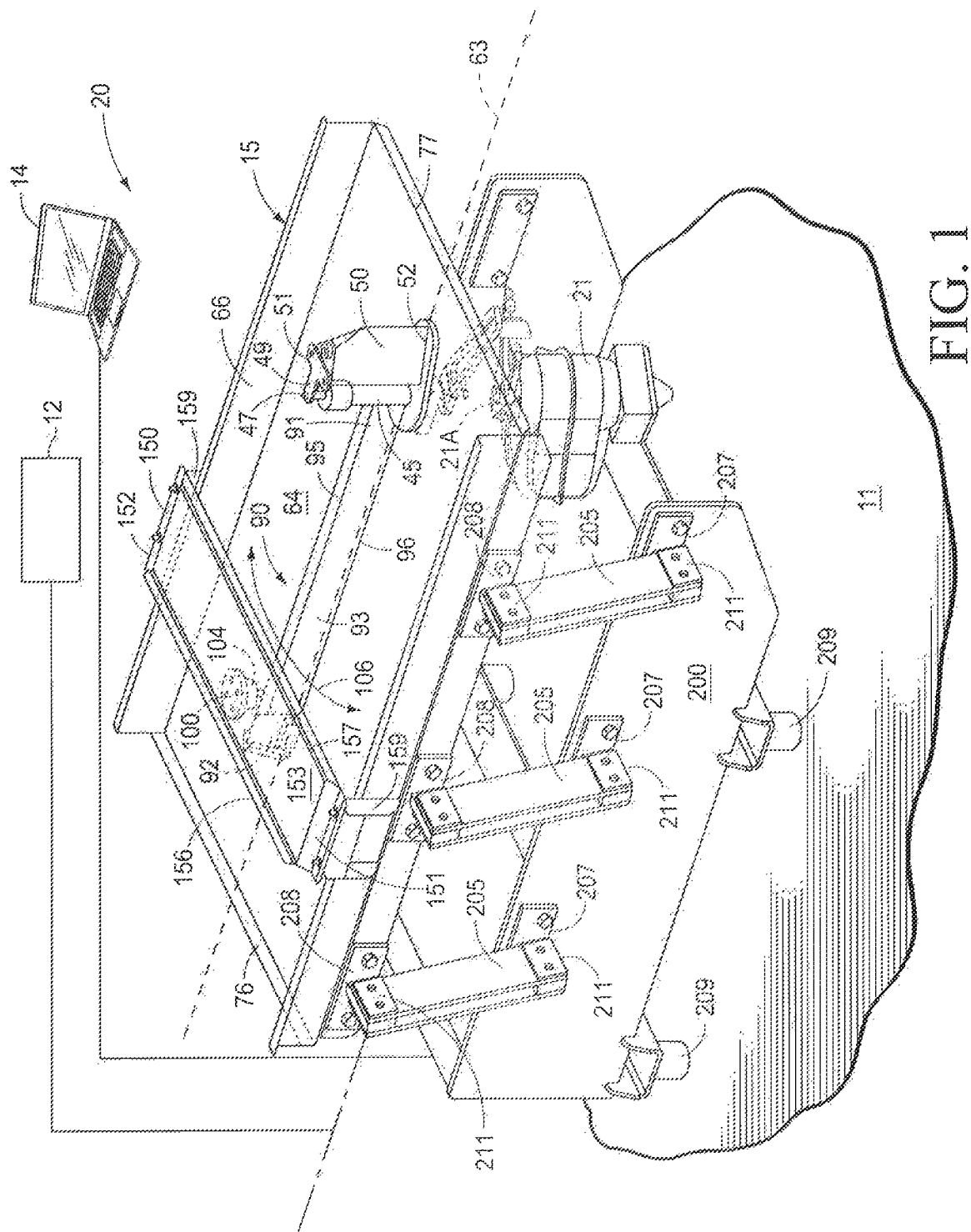
FIG. 1 is a perspective top, side and down-stream end of the instant product diverter on a reciprocally movable conveyor bed supported by a stationary base showing the diverter arm in a medial position on the product transporting surface.

An automated product diverter 20 for a reciprocally movable conveying device 15 generally provides a stationary base 200; a reciprocally movable conveyor bed 60 supported by the stationary base 200; a diverter arm 90 that moves in an arc of travel 106 along a product transporting surface 64 of the reciprocally movable conveyor bed 60; and an actuator 21 carried by the stationary base 200 and which operatively communicates with the diverter arm 90, and the reciprocal movement of the conveyor bed 60 and the diverter arm 90 is isolated from the actuator 21 carried by the stationary base 200.

The invention 20 is supported on the stationary base 200 which, in turn, rests upon an underlying supporting surface which is generally indicated by the numeral 11. The underlying supporting surface 11 may comprise a supporting floor of a factory, or other supporting surface which may be below or above the stationary base 200.

The stationary base 200 is generally rectilinear in configuration and has a first end portion; a second end portion; a first side portion; a second side portion; a top; and a bottom. A plurality of spaced leveling feet 209 which communicate with the bottom of the stationary base 200 provide a means for precisely leveling the invention 20 in its operating environment. The precise leveling of the invention 20 is important because inclines, declines, slants and the like of the invention will affect product movement on the product transporting surface 64. Base spring mounts 207 are fixedly attached to the exterior side surfaces of the stationary base 200 proximate to the top.

A powering source (not shown) is carried by the stationary base 200 and communicates with the reciprocally movable conveyor bed 60 so as to generate oscillation (repetitive back-and-forth movement) of the elongated conveyor bed 60, and the resulting movement of product (not shown) carried on a product transporting surface 64 of the elongated conveyor bed 60.

Figure 6:
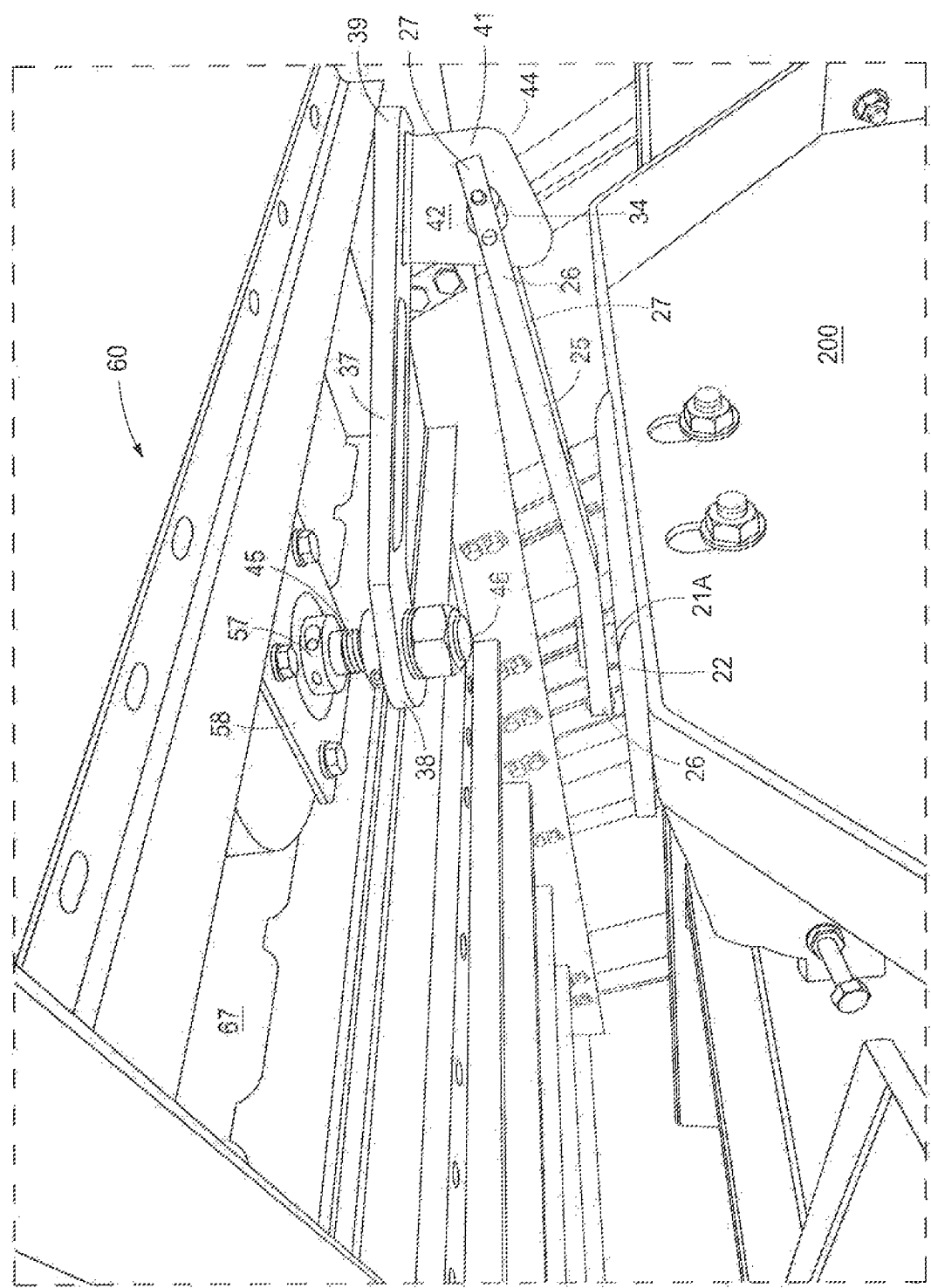
FIG. 6 is an enlarged, partial cutaway isometric view of the underside of the product transporting surface showing the diverter arm pivot shaft bushing, the bushing support and, the interconnection of the upper diverter arm and the lower diverter arm.
Figure 7:
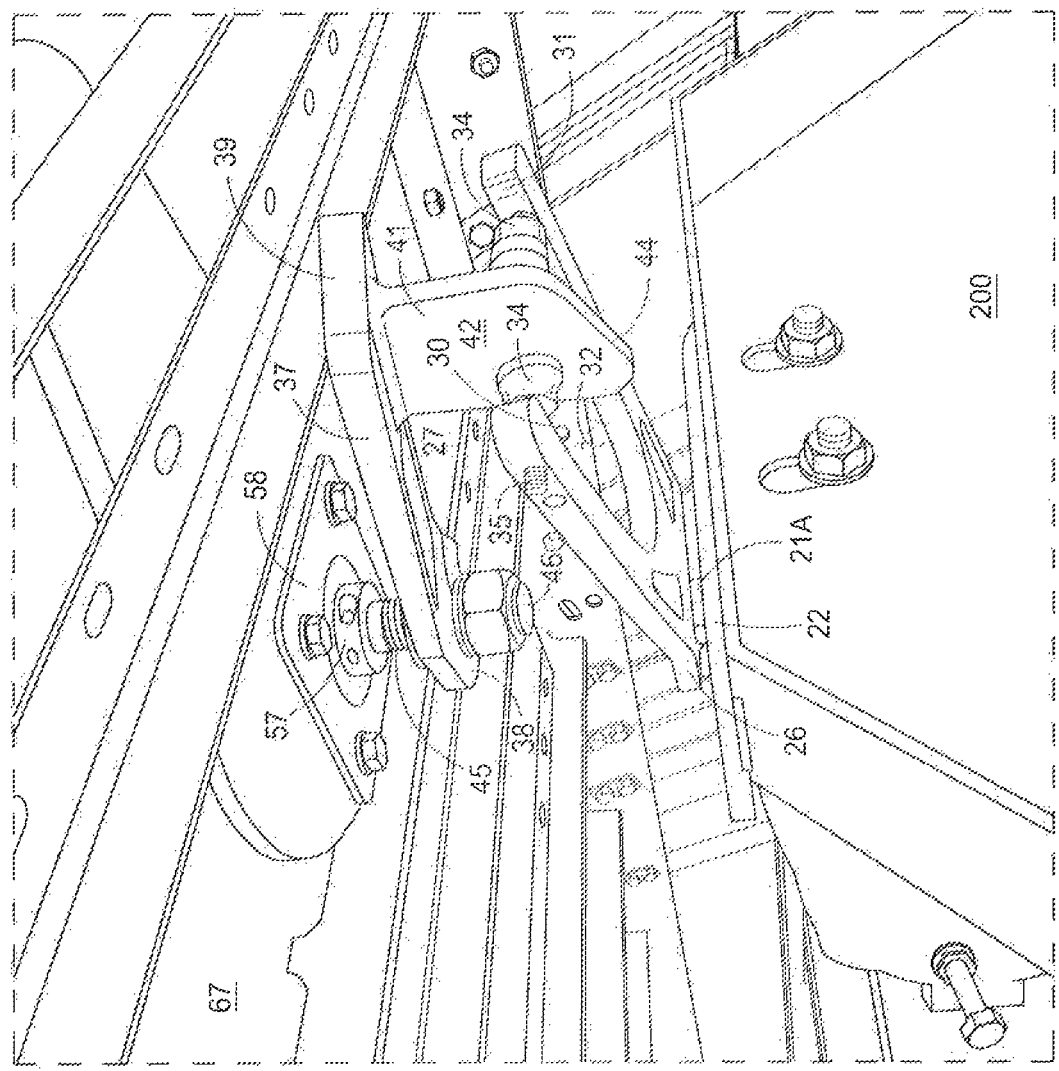
FIG. 7 is an isometric view, similar to that of FIG. 6, showing the details of the upper diverter arm paddle and the lower diverter arm yoke on the underside/bottom of the reciprocally movable conveyor bed.

The present invention 20 also includes an elongated reciprocally moveable, conveyor bed which is generally indicated by the numeral 60. The conveyor bed 60 has a first upstream product receiving end 76, and an opposite second down-stream product discharge end 77. Still further, the elongated conveyor bed 60 is generally defined by a longitudinal axis which is indicated by the line labeled 63. The elongated conveyor bed 60 has a product transporting surface 64, which is operable to be reciprocally moved in opposite directions, and at varying velocities so as to cause a product, which is deposited on the product transporting surface 64, to move between the opposite ends 76 and 77 in a predetermined manner. The elongated conveyor bed 60 also has a pair of spaced, substantially vertically disposed sidewalls 66 which confine the product on the product transporting surface 64. A frog 74 may be carried by the reciprocally movable conveyor bed 60 on an upstanding sidewall 66 thereof, proximate above the product transporting surface 64 to operatively communicate with the second end portion 92 of the diverter arm 90, when the second end portion 92 of the diverter arm 90 is adjacent to the frog 74. The frog 74 is an inwardly angulated protuberance that frictionally forces product moving along the product transporting surface 64 and immediately adjacent one of the upstanding sidewalls 66 toward a center portion of the product transporting surface and away from the upstanding sidewall 66. The conveyor bed 60 also has an underside/bottom surface 67. (FIG. 6) and conveyor bed spring mounts 208 are fixedly attached to exterior side portions of the reciprocally moveable conveyor bed 60.

A plurality of spacedly arrayed spring legs 205 communicate between the stationary base 200 base spring mounts 207 and the conveyor bed spring mounts 208 of the conveyor bed 60. The spring legs 205 facilitate substantially parallel movement of the conveyor bed 60 although it is recognized movement of the conveyor bed 60 relative to the stationary base 200 includes some minor component of vertical movement which is anticipated to be less than approximately 2% of the amount of horizontal movement. Each of the respective spring legs 205 has a lower/bottom or first end which is located proximate the stationary base 200; and an upper/top or second end which is located proximate to the conveyor bed 60. Each of the respective spring legs 205 is formed of a spring steel, or more commonly a synthetic composite such as, but not limited to, laminated fiberglass, carbon fiber, or the like. The respective spring legs 205 are strong, resilient, durable and resistant to torsion/twisting forces so as to impede any "yawing" motion of the conveyor bed 60 during operation. Each of the respective spring legs 205 are spaced apart from the other legs 205, and are substantially parallel to the others. The respective spring legs 205 provide an interconnection between the stationary base 200, and the conveyor bed 60. The length of the respective spring legs 205 from the upper/top end to the lower/bottom end positionally maintains the conveyor bed 60 in a predetermined spaced relationship above the stationary base 200. Each of the respective spring legs 205 defines plural fastener holes (not shown) in each opposing end portion for cooperation with a conventional fastener (not shown). The fasteners pass through the respective spring legs 205 so as to secure the respective spring legs 205 to the base spring mounts 207 which are mounted on the stationary base 200 respectively, and to the conveyor bed spring mounts 208 of the conveyor bed 60. Reinforcing plates 211 define fastener holes (not shown) that align with the fastener holes (not shown) and which are formed in the opposing end portions of the spring legs 205. These fastener holes are used to reinforce the attachment of the lower/bottom ends of the spring legs 205 to the spring mounts 207 of the stationary base 200. This arrangement also reinforces the spring leg upper/top ends to the conveyor bed spring leg mounts 208. The reinforcing plates 211, along with conventional fasteners, fixedly "sandwich" the respective spring leg 205 ends to the spring leg mounts 207, 208. The interconnection of the respective spring leg 205 ends to the conveyor bed 60, and to the stationary base 200 eliminate any "pivotal" interconnection therebetween. The fixed interconnection of the respective spring legs 205 to the conveyor bed 60, and the stationary frame 200 eliminates the need for bearings at the interconnections, and also reduces wear, and tear and the maintenance which is necessary to support the movable elongated conveyor bed 60. Further, the fixed interconnection of the respective spring legs 205 relative to the elongated conveyor bed 60, and the stationary base 200 provides for a substantially continuous tension to be generated as the elongated conveyor bed 60 is moved from a first position to a second position along a longitudinal axis 63 of the elongated conveyor bed 60. This reciprocal movement imparts predetermined movement to the product and which is carried on a product supporting surface 64. Further still, the use of the respective spring legs 205 and the fixed interconnections has a tendency to reduce the noise of operation, and further reduce the overall mass of the invention. The reduction of noise is attributable, at least in part, to the removal of movable/pivotal interconnections (e.g. bearings) which necessarily have some amount of "play" to facilitate movement and which may be exacerbated after periods of use.

The conveyor bed 60 is moveable along a reciprocal path of travel which is defined between a first forward position toward the first product receiving end 76 and a second rearward position toward the second product discharge end 77. In operation, the conveyor bed 60, as a general matter, does not reciprocate at an equal velocity when moving in the direction of the first forward position, or in the second, rearward position. Those familiar in the art of reciprocally movable linear conveyors will understand that the conveyor bed 60 when moved in the direction of the first forward position, moves at a velocity and with a displacement which carries the product in a forward direction at a first, predetermined speed or velocity. Then, the conveyor bed 60, when reversing direction, and moving in the second direction, moves at a velocity or speed which is higher than the predetermined first speed. Therefore, the product is slowly advanced, and the conveyor bed 60 is then moved rapidly backwards so that the product shuffles along the product transporting surface 64 when moving from one end to the other.

As shown in the Figures, the instant automated product diverter invention 20 has an actuator 21 that is releasably fixedly attached to the stationary base 200 by an actuator mounting bracket 22. The actuator 21 is preferably pneumatically powered, but may also be powered by other sources, such as, but not limited to electricity, and has a vertically upwardly extending rotatable actuator shaft 21A. The actuator shaft 21A is interconnected with, and carries, an elongated lower diverter arm 25 that extends radially outwardly from the rotatable actuator shaft 21A. The lower diverter arm 25 has a first end portion 26 that is connected to the rotatable actuator shaft 21A, by known means, and a spaced apart second end portion 27. The second end portion 27 defines a yoke 29 that further defines a medial space 32 bounded by a first side 30 of the yoke 29, a spaced apart second side 31 of the yoke 29 and a yoke base 33. A positionally adjustable bumper 34 is carried by the first side 30 of the yoke 29 and by the second side 31 of the yoke 29. The bumpers 34 extend from the first side 30 and the second side 31 into the medial space 32, toward one another. The adjustable bumpers 34 provide a means to adjust size of an air-gap 36 between each bumper 34 and a paddle 41 carried by an upper diverter arm 37. The adjustable positioning of the bumpers 34 relative to the yoke 29 may be accomplished by threaded shaft 35, although other adjustment means are likewise contemplated.

Figure 2:
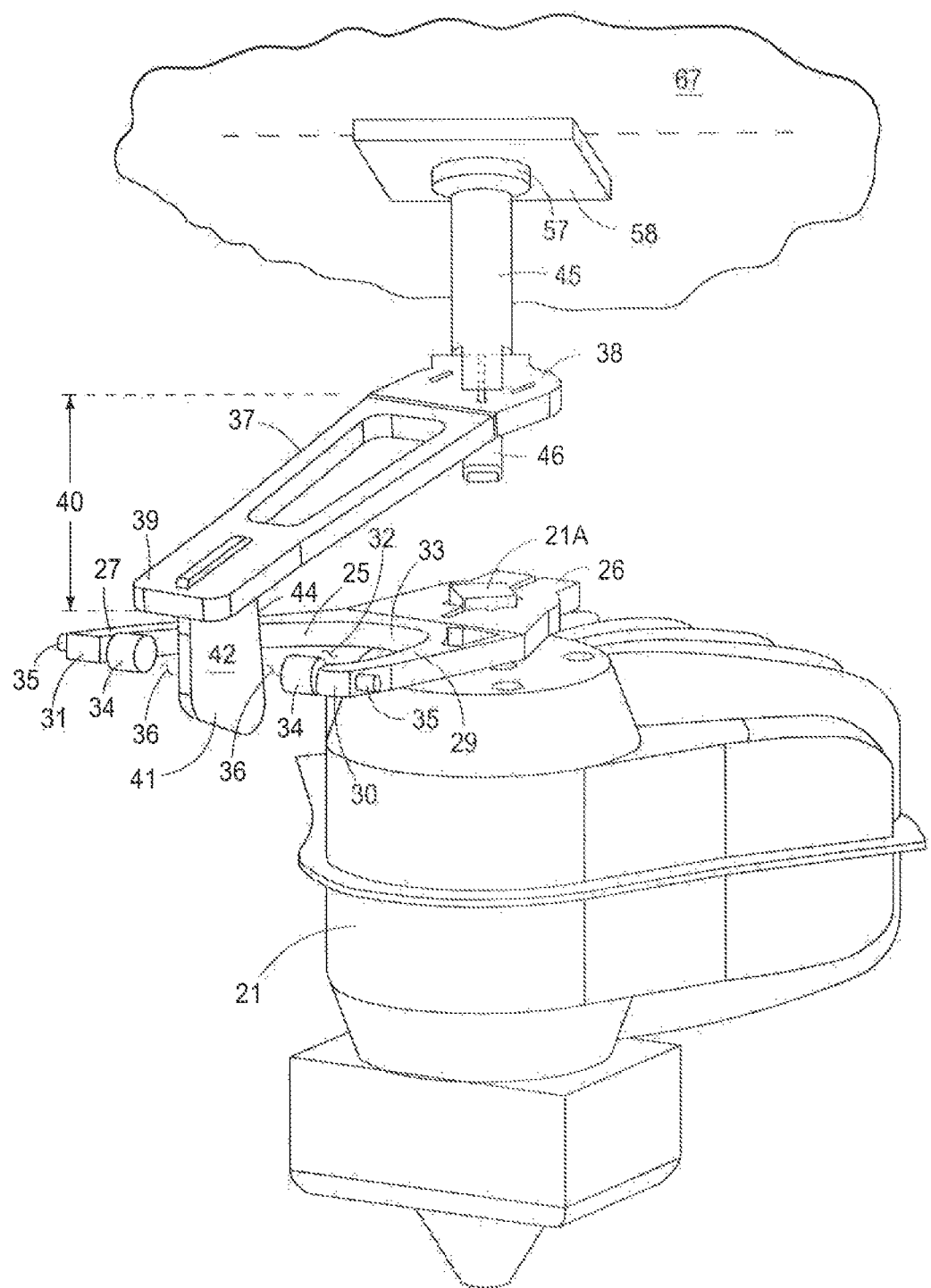
FIG. 2 is an enlarged perspective top and side view of the actuator, the lower diverter arm and the upper diverter arm interconnected with the diverter arm pivot shaft, and showing the air gaps between the yoke bumpers and the paddle.
Figure 3:
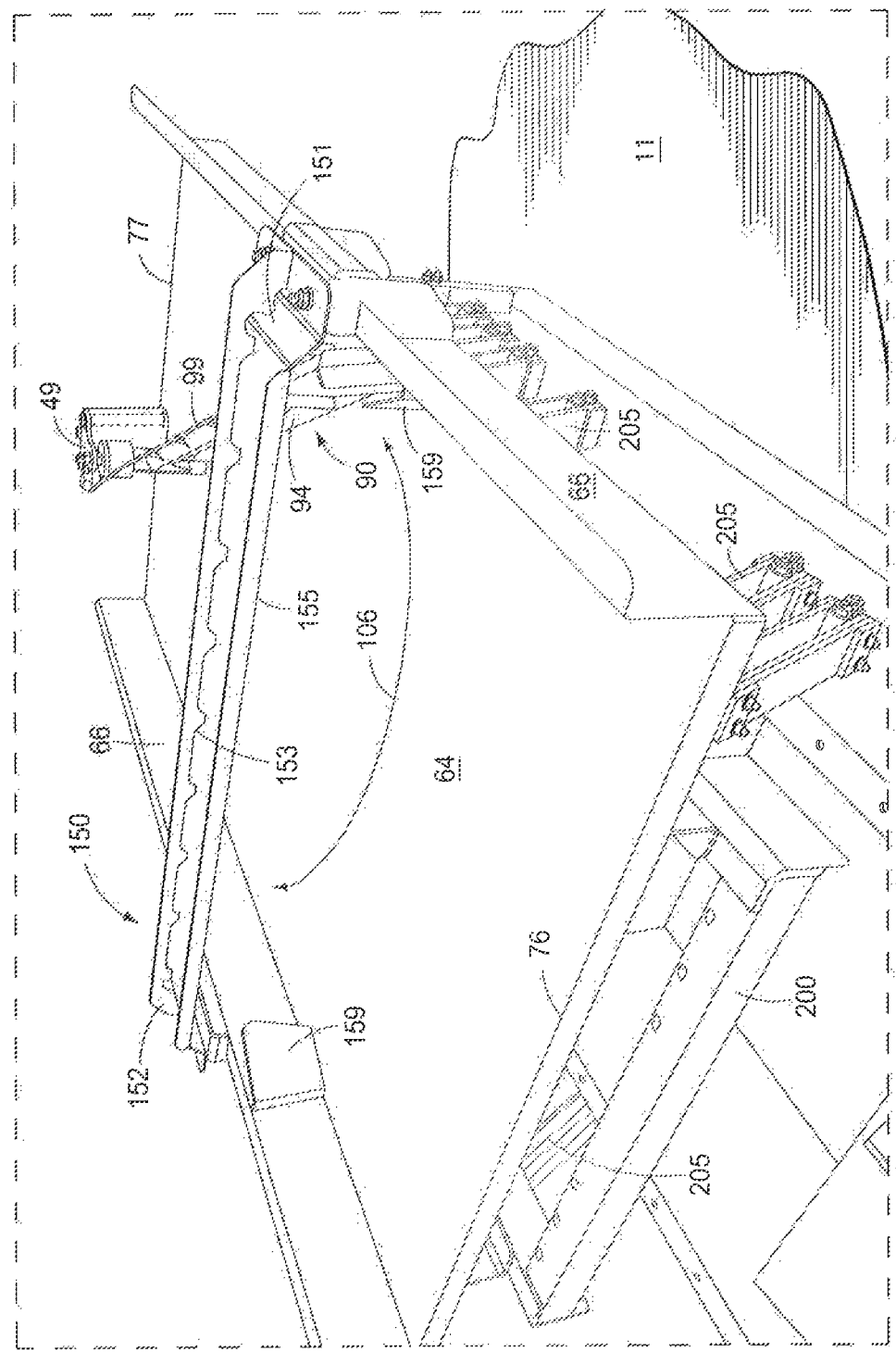
FIG. 3 is a perspective top, first side and upstream end view of the product diverter showing the diverter arm pivoted to a first position adjacent one upstanding sidewall of the reciprocally movable conveyor bed.

As shown in FIG. 2, the upper diverter arm 37 is elongated and has a first end portion 38 and a spaced apart second end portion 39. The second end portion 39 is vertically offset 40 from the first end portion 38. The first end portion 38 of the upper diverter arm 37 is releasably fixedly interconnected to a diverter arm pivot shaft 45 that is axially rotatably carried by a bushing 57 and a bushing support 58 that is fixedly secured to an underside 67 of the reciprocally movable conveyor bed 60.

The diverter arm pivot shaft 45 extends through the reciprocally movable conveyor bed 60 so that a second upper end portion 47 of the diverter arm pivot shaft 45, opposite the upper diverter arm 37 extends through and extends vertically above the product transporting surface 64 of the reciprocally movable conveyor bed 60. The paddle 41 is structurally interconnected to the second end portion 39 of the upper diverter arm 37 and has a generally planar first side 42 and a generally planar second side 43 and defines a peripheral edge 44 extending thereabout. The paddle 41 extends vertically downwardly from the second end 39 of the upper diverter arm 37 opposite the reciprocally movable conveyor bed 60 so that the paddle 41 is positioned within the medial space 32 defined by the yoke 29 and an air gap 36 is maintained between each planar side 42, 43 of the paddle 41 and each positionally adjustable bumper 34 carried by the lower diverter arm 25 yoke 29.

A pivot shaft support 49 is interconnected with the second upper end portion 47 of the diverter arm pivot shaft 45 and also with an upper edge portion 51 of a vertical support 50 that has a bottom edge portion 52 that is fixedly attached to the product supporting surface 64 of the reciprocally movable conveyor bed 60 downstream of the diverter arm pivot shaft 45.

Figure 4:
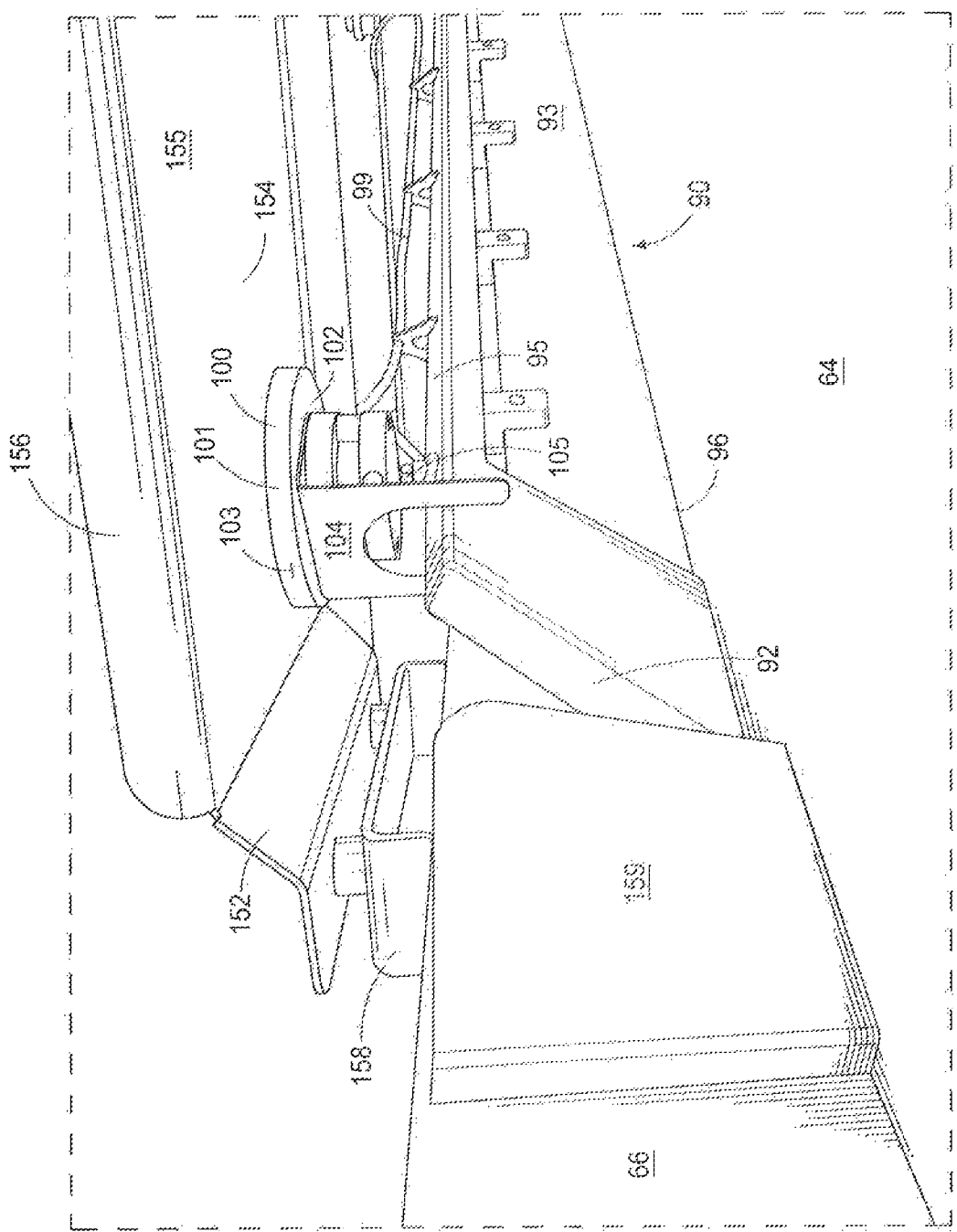
FIG. 4 is an enlarged perspective view of the second end portion of the diverter arm on the product transporting surface and adjacent a second upstanding sidewall of the reciprocally movable conveyor bed, and showing the pneumatic puck communicating with the underside of the diverter bridge.
Figure 5:
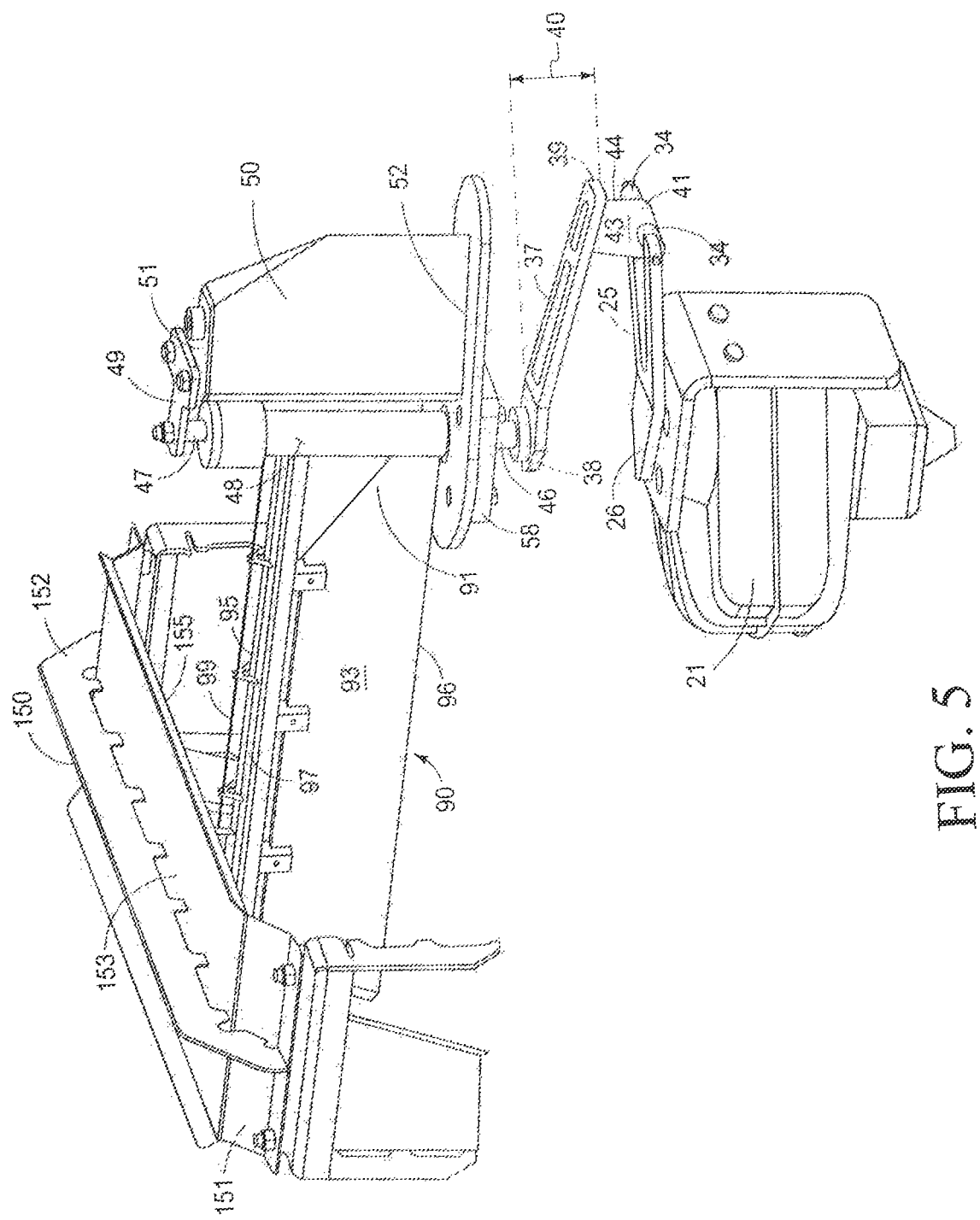
FIG. 5 is a fragmentary side and top view of the product diverter assembly, less the reciprocally movable conveyor bed, and less the stationary base.

The diverter arm 90 is structurally interconnected with, and extends radially upstream from, the diverter arm pivot shaft 45 extending above the product transporting surface 64 of the reciprocally movable conveyor bed 60. The diverter arm 90 is elongate and has a first end portion 91 that is structurally interconnected to an outwardly facing circumferential surface 48 of the diverter pivot arm shaft 45 and a spaced apart second end portion 92 that extends upstream therefrom. As shown in FIG. 4 the terminal end surface of the second and portion 92 may be beveled/angled to assist in shearing product moving along the product transporting surface 64. The diverter arm 90 further has a first lateral side 93 and an opposing second lateral side 94, a top edge 95, a bottom edge 96 and a track 97 is defined in the top edge 95 of the diverter arm 90 to carry a pneumatic line 99 that pneumatically communicates between a pneumatic source 12 and a pneumatic puck 100 that is carried by a puck bracket 104 on the top edge 95 of the diverter arm 90 adjacent the second end portion 92.

The pneumatic puck 100 has a top surface 101, a bottom surface 102 and an outwardly facing edge portion 103.

A diverter bridge 150 extends transversely across the reciprocally movable conveyor bed 60 and is spacedly above the product transporting surface 64 upstream of the diverter arm pivot axle 45 and adjacent above the second end portion 92 of the diverter arm 90. The diverter bridge 150 has a first end portion 151 that is fixedly connected to one upstanding sidewall 66 of the reciprocally movable conveyor bed 60 with a conveyor bed connector 159, and a second end portion 152 that is fixedly connected to a second upstanding sidewall 66 of the reciprocally movable conveyor bed 60 with a conveyor bed connector 159. The diverter bridge 150 further has a top portion 153, a bottom portion 155 defining a puck track 154, an upstream edge 156 and a downstream edge 157. The pneumatic puck 100 carried at the second end portion 92 of the diverter arm 90 movably engages with the puck track 154 defined in the bottom portion 156 of the diverter bridge 150 as the diverter arm 90 moves in its arc of travel 106 between the first position adjacent one upstanding sidewall 66 of the reciprocally movable conveyor bed 60 and the second position adjacent a second upstanding sidewall 66 of the reciprocally movable conveyor bed 60 responsive to axial rotation of the actuator shaft 21A of the actuator 21 and axial rotation of the diverter arm pivot shaft 45.

The diverter arm 90 is positionally secured in the first position relative to the product transporting surface 64, in the second position relative to the product transporting surface 64 in any desired position relative to the product transporting surface 64, by actuation of the pneumatic source 12 which communicates with the pneumatic puck 100 by means of pneumatic line 99 which responsively causes the pneumatic puck 100 to actuate and cause a cylinder piston 105 to positionally secure the diverter arm 90 relative to the diverter bridge 150 and the product transporting surface 64.

Figure 8:
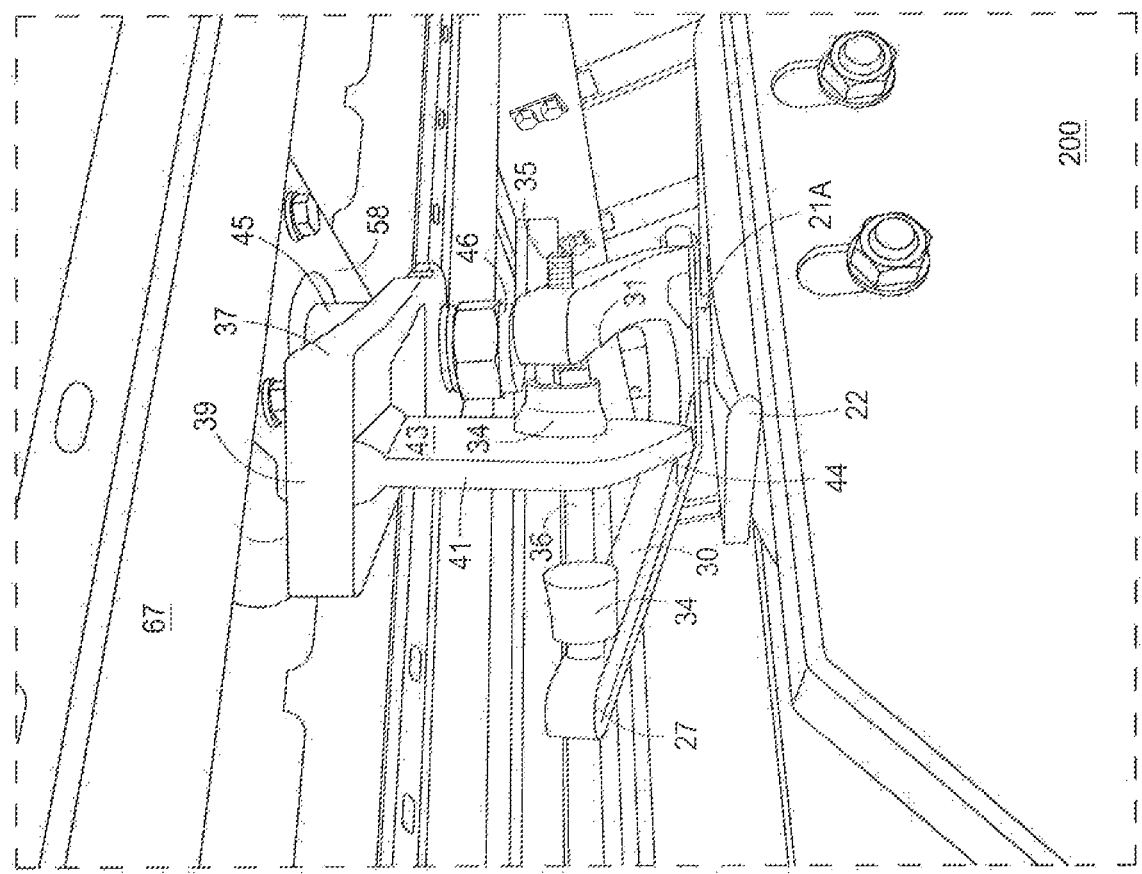
FIG. 8 is an isometric view, similar to that of FIG. 7 showing the air gap between the adjustable bumper and the paddle.

As best shown in FIGS. 2 and 8, the air gaps 36 between the positionally adjustable bumpers 34 and the paddle 41 allow the reciprocally movable conveyor bed 60, and all the components attached thereto, including, but not limited to, the diverter arm 90 and the actuator arm pivot axle 45, and the upper diverter arm 37, to be vibrationally isolated from the actuator 21 and the components attached thereto and communicating therewith, including, but not limited to, the lower diverter arm 25, the actuator shaft 21A and the stationary base 200. The vibrational isolation of the actuator 21 from the reciprocally movable conveyor bed 60 provides durability and long operational life of the instant invention because when the actuator 21 is actuated by a signal (not shown) from the controller 14, the actuator shaft 21A rotates which causes one of the positionally adjustable bumper's 34 to first close the air gap 36 and then to frictionally engage the paddle 41 and force the paddle 41 in an arc of travel about an axis of the diverter arm pivot shaft 45, which responsively causes the diverter arm 90 to move in its arc of travel 106. Actuation of the pneumatic puck 100 positionally secures the diverter arm 90 in a desired position. The actuator 21 and the positionally adjustable bumper 34 are not continuously frictionally engaged with the paddle 41 to positionally maintain the position of the diverter arm 90, and the positionally adjustable bumper 34 and the yoke 29 are free to disengage from the paddle 41 allowing the repetitive reciprocal movement of the conveyor bed 60, and its attached components, to operate/move freely and separately from the actuator 21 and its attached components.

The reciprocally movable conveyor bed 60; and the lower diverter arm 25 and the upper diverter arm 37 are vibrationally isolated from one another by the air gaps 36 so that the reciprocal movement of the conveyor bed 60, and its attached components, is not communicated to the lower diverter arm 25 nor to the actuator 21, nor to the stationary base 200. This physical separation, and vibrational isolation, prevents the vibratory motion of the conveyor bed 60 from damaging the actuator 21 and yet still facilitates physical communication between the paddle 41 and the bumpers 34 of the yoke 29 when rotation of the diverter arm 90 is needed or desired by an operator. (not shown).

Figure 9:
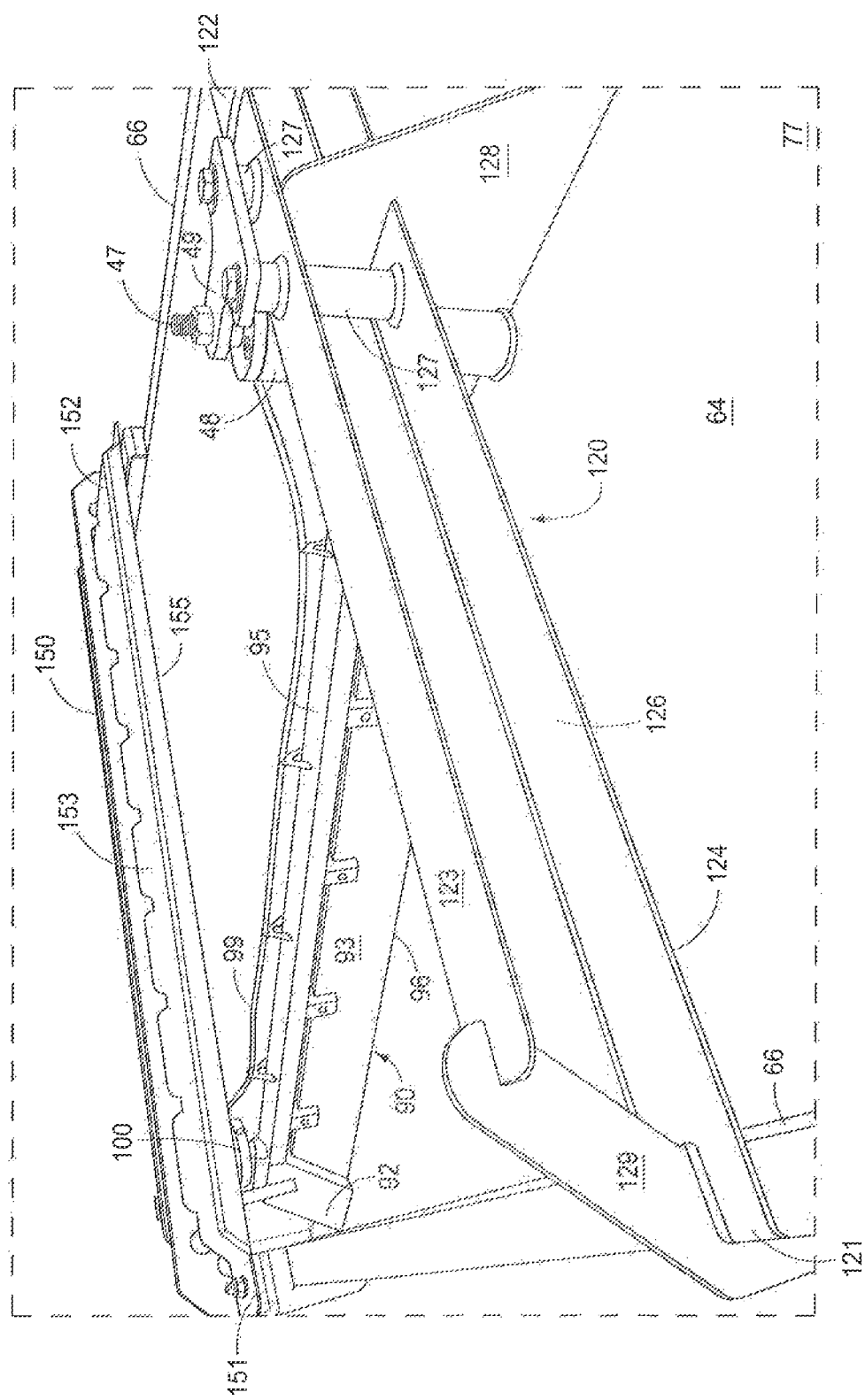
FIG. 9 is a top perspective upstream looking view of a second embodiment of the present invention, showing a pivot bridge extending transversely across the reciprocally movable conveyor bed and supporting the upper end portion of the diverter arm pivot shaft down-stream of the diverter bridge.

As shown in FIG. 9, in a second contemplated embodiment of the present invention 20, a pivot bridge 120 having a first end portion 121 and a spaced apart second end portion 122, a top portion 123, an opposing bottom portion 124, an upstream edge 125 and a downstream edge 126. The pivot bridge 120 further has a pivot axle support post 127 generally medially between the first end portion 121 and the second end portion 122 to carry a pivot shaft support 49 that communicates with the upper end portion of the diverter arm pivot shaft 45. The pivot bridge 120 further has a diverter vane 128 adjacent downstream of the diverter arm pivot shaft 45 that extends outwardly from the downstream edge 126 of the pivot bridge 120 generally along a longitudinal axis 63 of the product transporting surface 64. The pivot bridge 120 is interconnected at the first end portion 121 and at the second end portion 122 with spaced upstanding sidewalls 66 of the reciprocally movable conveyor bed 60.

Responsive to a signal (not shown) received from the controller 14, which may be, but is not limited to a computer the diverter arm 90 pivots to either a first position which directs product moving along the product transporting surface 64 to a first path of travel, or the diverter arm 90 pivots to a second position, which directs product moving along the product transporting surface 64 to a second path of travel, or the diverter arm 90 is pivoted to a third position which directs product moving along the product transporting surface 64 to both the first and the second path of travel.

The present invention is an automated product diverter 20 for a reciprocally movable conveying device 15 is and comprises a stationary base 200; a reciprocally movable conveyor bed 60 supported by the stationary base 200, the reciprocally movable conveyor bed 60 having a product transporting surface 64 with an first upstream product receiving end 76 and a second downstream product discharge end 77, and two spaced apart upstanding sidewalls 66; a diverter arm 90 having a first end portion 91 and a second end portion 92 and that is pivotally attached to the reciprocally movable conveyor bed 60 by a vertically extending diverter arm pivot shaft 45 that extends through the product transporting surface 64 and which interconnects with the first end portion 91 of the diverter arm 90, and the second end portion 92 of the diverter arm 90 is positionally movable along the product transporting surface 64 in an arc of travel 106 between the two spaced apart upstanding sidewalls 66, and the reciprocal movement of the conveyor bed 60 is communicated to the diverter arm 90; an actuator 21 carried by the stationary base 200 that operatively communicates with the diverter arm pivot shaft 45 to operatively pivot the diverter arm 90 in the arc of travel 106; and the actuator 21 is vibrationally isolated from the reciprocal movement of the conveyor bed 60 and the diverter arm 90 so that the actuator 21 does not reciprocally move responsive the reciprocal movement of the diverter arm 90 or reciprocal movement of the conveyor bed 60.

Operation

The operation of the described embodiment of the present invention 20 is believed to be readily apparent and is briefly summarized at this point.

A first aspect of the present invention relates to a product diverter for a reciprocally movable conveying device and generally provides a stationary base 200; a reciprocally movable conveyor bed 60 supported by the stationary base 200; a diverter arm 90 that moves in an arc of travel 106 along a product transporting surface 64 of the reciprocally movable conveyor 60; and an actuator 21 carried by the stationary base 200 and which operatively communicates with the diverter arm 90, and the repetitive reciprocal movement of the conveyor bed 60 and the diverter arm 90 is vibrational he isolated from the actuator 21 carried by the stationary base 200.

A further aspect of the present invention is a product diverter 20 for a reciprocally movable conveying device having a stationary base 200, and a reciprocally movable conveyor bed 60 having a product transporting surface 64 with an upstream product receiving end 76 and a downstream product discharge end 77, the product diverter 20 comprising an actuator 21 interconnected to the stationary base 200 and having a rotatable actuator shaft 21A carrying a lower diverter arm 25 that defines a yoke 29 that further defines a medial space 32; an axially rotatable diverter arm pivot shaft 45 is carried by the reciprocally movable conveyor bed 60 and an upper end portion 47 of the diverter arm pivot shaft 45 extends vertically above the product transporting surface 64 and a lower end portion of the diverter arm pivot shaft 45 is vertically below the product transporting surface 64 and the lower end portion of the diverter arm pivot shaft 45 carries an upper diverter arm 37 which further has a paddle 41 at an end portion opposite the diverter arm pivot shaft 45 and the paddle 41 is positioned within the medial space 32 defined by the yoke 29 and an air gap 36 is substantially maintained between side portions of the paddle 41 and the yoke 29; a diverter arm 90 is interconnected with and extends radially upstream from the diverter arm pivot shaft 45 that is above the product transporting surface 64 and the diverter arm 90 has a first end portion and a second end portion 92, a first side 93 and a second side 94, a top edge 95 and a bottom edge 96 and a pneumatic puck 100 is carried by a puck bracket 104 on the top edge 95 adjacent the second end portion 92 and the diverter arm 90 moves in an arc between a first position and a second position as the diverter arm pivot shaft 45 axially rotates; a diverter bridge 150 that extends transversely across the reciprocally movable conveyor bed 60 spacedly above the product transporting surface 64 and upstream of the diverter arm pivot shaft 45, the diverter bridge 150 having first and second end portions that are interconnected to the reciprocally movable conveyor bed 60 and defines a puck track 154, for the pneumatic puck 100 to move along as the diverter arm 90 moves between the first position and the second; and a pneumatic source communicating with the pneumatic puck 100, that when actuated positionally secures the diverter arm 90 relative to the product transporting surface 64; and the lower diverter arm 25 and the upper diverter arm 37 are isolated from one another by the air gaps 36 so that the reciprocal movement of the conveyor bed 60 is not communicated to the lower diverter arm 25.

A further aspect of the present invention is an automated product diverter that further comprises a pivot shaft support 49 is interconnected with the second upper end portion 47 of the diverter arm pivot shaft 45 and with an upper edge portion 51 of a vertical support 50 that has an opposing bottom edge portion 52 that is fixedly attached to the product supporting surface 64 of the reciprocally movable conveyor bed 60 downstream of the diverter arm pivot shaft 45.

A further aspect of the present invention is a product diverter further comprising a positionally adjustable bumper 34 carried on each spaced apart side of the yoke 29, and each adjustable bumper 34 provides a means to adjust size of the air-gap 36 between each bumper 34 and the paddle 41 carried by an upper diverter arm 37.

A further aspect of the present invention is a product diverter further comprises a pivot bridge 120 having a first end portion 121 and a spaced apart second end portion 122, a top portion 123 and an opposing bottom portion 124, an upstream edge 125 and a downstream edge 126, the pivot bridge 120 further has a pivot axle support post 127 between the first end portion 121 and the second end portion 122 to carry a pivot shaft support 49 that communicates with the upper end portion of the diverter arm pivot shaft 45, and the pivot bridge 120 has a diverter vane 128 adjacent downstream to the diverter arm pivot shaft 45 that extends outwardly from the downstream edge 126 of the pivot bridge 120 generally along a longitudinal axis 63 of the product transporting surface 64, and the pivot bridge 120 is interconnected at the first end portion 121 and at the second end portion 122 with spaced upstanding sidewalls 66 of the reciprocally movable conveyor bed 60.

A further aspect of the present invention is a product diverter and further comprises a track 97 is defined in the top edge 95 of the diverter arm 90 to carry a pneumatic line 99 that pneumatically communicates between the pneumatic source 12 and the pneumatic puck 100.

A further aspect of the present invention is a product diverter and further comprises a frog 47 carried by the reciprocally movable conveyor bed 60 on an upstanding side wall 66 thereof proximate above the product transporting surface 64 to operatively cooperate with the second end portion 92 of the diverter arm 90 when the second end portion 92 of the diverter arm 90 is adjacent the frog 74.

A further aspect of the present invention is a product diverter and further comprises a bushing 57 and a bushing support 58 fixedly secured to an underside 67 of the reciprocally movable conveyor bed 60, and the diverter arm pivot shaft 45 extends therethrough and is rotatably supported by the bushing 57 and the bushing support 58.

A further aspect of the present invention is a product diverter and wherein the yoke further defines a medial space 32 bounded by a first side 30 of the yoke 29, a spaced apart second side 31 of the yoke 29 and a yoke base 33; and the first side 30 of the yoke 29 and the second side 31 of the yoke 29 each carry a positionally adjustable bumper 34 that provides a means to adjust size of the air-gap 36 between each bumper 34 and the paddle 41.

A further aspect of the present invention is a product diverter and wherein the actuator 21 is releasably fixedly attached to the stationary base 200 of the product moving apparatus 15 with an actuator mounting bracket 22.

A further aspect of the present invention is a product diverter 20 and wherein the first end portion 38 of the upper diverter arm 37 is vertically offset from the spaced apart second end portion 39 of the upper diverter arm 37.

A further aspect of the present invention is a product diverter 20 and wherein the pneumatic puck 100 has a top surface 101, a bottom surface 102 and an outwardly facing edge portion 103 and the pneumatic puck 100 is expandable responsive to receiving pneumatic pressure from the pneumatic source 12.

A further aspect of the present invention is a product diverter 20 and further comprises a cylinder piston 105 operatively communicating with the pneumatic puck 100 that is partially extended from the pneumatic puck 100 responsive to the pneumatic puck 100 receiving pneumatic pressure from the pneumatic source 12.

A further aspect of the present invention is a product diverter 20 and wherein responsive to a signal received from a controller 14, the diverter arm 90 pivots along an arc of travel 106 to a first position which directs product moving along the product transporting surface 64 to a first path of travel, or the diverter arm 90 pivots to a second position which directs product moving along the product transporting surface 64 to a second path of travel, or the diverter arm 90 is pivoted to a third position which directs product moving along the product transporting surface 64 to both the first and the second path of travel.

A further aspect of the present invention is a product diverter for a product moving apparatus 15 having a stationary base 200, and a reciprocally movable conveyor bed 60 having a product transporting surface 64 with an upstream product receiving end 76 and a downstream product discharge end 77, the product diverter 20 comprising an actuator 21 releasably fixedly attached to the stationary base 200 of the product moving apparatus 15 by an actuator mounting bracket 22, the actuator 21 having a rotatable actuator shaft 21A carrying a lower diverter arm 25 that extends radially outwardly from the rotatable actuator shaft 21A, the lower diverter arm 25 having a first end portion 26 that is connected to the rotatable actuator shaft 21A and a spaced apart second end portion 27 that defines a yoke 29 that further defines a medial space 32 bounded by a first side 30 of the yoke 29, a spaced apart second side 31 of the yoke 29 and a yoke base 33, the first side 30 of the yoke 29 and the second side 31 of the yoke 29 each carrying a positionally adjustable bumper 34 that provides a means to adjust size of an air-gap 36 between each bumper 34 and a paddle 41 carried by an upper diverter arm 37; the upper diverter arm 37 has a first end portion 38 and a spaced apart second end portion 39, and the second end portion 39 is vertically offset 40 from the first end portion 38, and the first end portion 38 of the upper diverter arm 37 is releasably fixedly interconnected to a diverter arm pivot shaft 45 that is axially rotatably carried by a bushing 57 and a bushing support 58 that is fixedly secured to an underside 67 of the reciprocally movable conveyor bed 60, and the diverter arm pivot shaft 45 extends through the reciprocally movable conveyor bed 60 so that a second upper end portion 47 of the diverter arm pivot shaft 45, opposite the upper diverter arm 37 extends through and is spacedly vertically above the product transporting surface 64 of the reciprocally movable conveyor bed 60; the paddle 41 is structurally interconnected to the second end portion 39 of the upper diverter arm 37 and has a generally planar first side 42 and a generally planar second side 43 and defines a peripheral edge 44 extending thereabout and the paddle 41 extends vertically downwardly from the second end 39 of the upper diverter arm 37 opposite the reciprocally movable conveyor bed 60 so that the paddle 41 is positioned within the medial space 32 defined by the yoke 29 and an air gap 36 is maintained between each planar side 42, 43 of the paddle 41 and each bumper 34 carried by the lower diverter arm 25 yoke 29; a pivot shaft support 49 is interconnected with the second upper end portion 47 of the diverter arm pivot shaft 45 and with an upper edge portion 51 of a vertical support 50 that has an opposing bottom edge portion 52 that is fixedly attached to the product supporting surface 64 of the reciprocally movable conveyor bed 60 downstream of the diverter arm pivot shaft 45; a diverter arm 90 is structurally interconnected with, and extends radially upstream from, an outwardly facing circumferential surface 48 of the diverter arm pivot shaft 45 that extends above the product transporting surface 64 of the reciprocally movable conveyor bed 60, and the diverter arm 90 has a first end portion 91 that is structurally interconnected to the outwardly facing circumferential surface 48 of the diverter pivot arm shaft 45 and a spaced apart second end portion 92 that extends upstream therefrom, and the diverter arm 90 further has a first lateral side 93 and an opposing second lateral side 94, a top edge 95 and a bottom edge 96 and a track 97 is defined in the top edge 95 of the diverter arm 90 to carry a pneumatic line 99 that pneumatically communicates between a pneumatic source 12 and a pneumatic puck 100 that is carried by a puck bracket 104 on the top edge 95 of the diverter arm 90 adjacent the second end portion 92, and the pneumatic puck 100 has a top surface 101, a bottom surface 102 and an outwardly facing edge portion 103 and the diverter arm 90 moves between a first position and a second position as the diverter arm pivot shaft 45 axially rotates responsive to actuation of the actuator 21; a diverter bridge 150 that extends transversely across the reciprocally movable conveyor bed 60 and is spacedly above the product transporting surface 64 upstream of the pivot bridge 120 and adjacent above the second end portion 92 of the diverter arm 90 as the diverter arm 90 moves between the first position and the second position, the diverter bridge 150 having a first end portion 151 that is fixedly connected to one upstanding sidewall 66 of the reciprocally movable conveyor bed 60 with a conveyor bed connector 159, and a second end portion 152 that is fixedly connected to a second upstanding sidewall 66 of the reciprocally movable conveyor bed 60 with a conveyor bed connector 159, the diverter bridge 150 further having a top portion 153 and a bottom portion 155 defining a puck track 154, an upstream edge 156 and a downstream edge 157, and the pneumatic puck 100 carried at the second end portion 92 of the diverter arm 90 movably engages with the puck track 154 defined in the bottom portion 155 of the diverter bridge 150 as the diverter arm 90 moves between the first position adjacent one upstanding sidewall 66 of the reciprocally movable conveyor bed 60 and the second position adjacent a second upstanding sidewall 66 of the reciprocally movable conveyor bed 60 responsive to axial rotation of the actuator shaft 21A of the actuator 21 and axial rotation of the diverter am pivot shaft 45; and the diverter arm 90 is positionally secured in the first position relative to the product transporting surface 64 or in the second position relative to the product transporting surface 64 by actuation of the pneumatic source 12 which communicates with the pneumatic puck 100 which responsively causes the pneumatic puck 100 to expand and cause a cylinder piston 105 to positionally secure the diverter arm 90 relative to the diverter bridge 150 and the product transporting surface 64 of the reciprocally movable conveyor bed 60; and the lower diverter arm 25 and the upper diverter arm 37 are isolated from one another by the air gaps 36 so that the reciprocal movement of the conveyor bed 60 is not communicated to the lower diverter arm 25.

An even still further aspect of the present invention is a product diverter 20 for a reciprocally movable conveying device comprising a stationary base 200; a reciprocally movable conveyor bed 60 supported by the stationary base 200, the reciprocally movable conveyor bed 60 having a product transporting surface 64 with a first upstream product receiving end 67 and a second downstream product discharge end 68, and two spaced apart upstanding sidewalls 66; a diverter arm 90 having a first end portion 91 and a second end portion 92 and that is pivotally attached to the reciprocally movable conveyor bed 60 by a vertically extending the diverter arm pivot shaft 45 that extends through the product transporting surface 64 and which interconnects with the first end portion 91 of the diverter arm 90, and the second end portion 92 of the diverter arm 90 is positionally movable along the product transporting surface 64 in an arc of travel 106 between the two spaced apart upstanding sidewalls 66, and the repetitive reciprocal movement of the conveyor bed 60 is communicated to the diverter arm 90; an actuator 21 carried by the stationary base 200 that operatively communicates with the diverter arm pivot shaft 45 to operatively pivot the diverter arm 90 in the arc of travel 106; and the actuator 21 is vibrationally isolated from the repetitive reciprocal movement of the diverter arm 90 so that the actuator 21 does not reciprocally move responsive the repetitive reciprocal movement of the diverter arm 90 or the reciprocally movable conveyor bed 60.

We claim:

1. A product diverter for a product moving apparatus having a stationary base, and a reciprocally movable conveyor bed having a product transporting surface with an upstream product receiving end and a downstream product discharge end, the product diverter comprising:

an actuator interconnected to the stationary base and having a rotatable actuator shaft carrying a lower diverter arm that defines a yoke that further defines a medial space;

an axially rotatable diverter arm pivot shaft is carried by the reciprocally movable conveyor bed and an upper end portion of the diverter arm pivot shaft extends vertically above the product transporting surface and a lower end portion of the diverter arm pivot shaft is vertically below the product transporting surface and the lower end portion of the diverter arm pivot shaft carries an upper diverter arm which further has a paddle at an end portion opposite the diverter arm pivot shaft and the paddle is positioned within the medial space defined by the yoke and an air gap is substantially maintained between side portions of the paddle and the yoke;

a diverter arm is interconnected with and extends radially upstream from the diverter arm pivot shaft that is above the product transporting surface and the diverter arm has a first end portion and a second end portion, a first side and a second side, a top edge and a bottom edge and a pneumatic puck is carried by a puck bracket on the top edge adjacent the second end portion and the diverter arm moves between a first position and a second position as the diverter arm pivot shaft axially rotates;

a diverter bridge that extends transversely across the reciprocally movable conveyor bed spacedly above the product transporting surface and upstream of the diverter arm pivot shaft, the diverter bridge having first and second end portions that are interconnected to the reciprocally movable conveyor bed and defines a puck track, for the pneumatic puck to move along as the diverter arm moves between the first position and the second; and a pneumatic source communicating with the pneumatic puck, that when actuated positionally secures the diverter arm relative to the product transporting surface; and the lower diverter arm and the upper diverter arm are isolated from one another by the air gaps so that the reciprocal movement of the conveyor bed is not communicated to the lower diverter arm.

2. A product diverter as claimed in claim 1 and further comprising:

a pivot shaft support is interconnected with the second upper end portion of the diverter arm pivot shaft and with an upper edge portion of a vertical support that has an opposing bottom edge portion that is fixedly attached to the product supporting surface of the reciprocally movable conveyor bed downstream of the diverter arm pivot shaft.

3. A product diverter as claimed in claim 1 and further comprising:

a positionally adjustable bumper carried on each spaced apart side of the yoke, and each adjustable bumper provides a means to adjust size of the air-gap between each bumper and the paddle carried by the upper diverter arm.

4. A product diverter as claimed in claim 1 and further comprising:

a pivot bridge having a first end portion and a spaced apart second end portion, a top portion and an opposing bottom portion, an upstream edge and a downstream edge, the pivot bridge further has a pivot axle support post between the first end portion and the second end portion to carry a pivot shaft support that communicates with the upper end portion of the diverter arm pivot shaft, and the pivot bridge has a diverter vane adjacent downstream to the diverter arm pivot shaft that extends outwardly from the downstream edge of the pivot bridge generally along a longitudinal axis of the product transporting surface, and the pivot bridge is interconnected at the first end portion and at the second end portion with spaced upstanding sidewalls of the reciprocally movable conveyor bed.

5. A product diverter as claimed in claim 1 and further comprising:

a track is defined in the top edge of the diverter arm to carry a pneumatic line that pneumatically communicates between the pneumatic source and the pneumatic puck.

6. A product diverter as claimed in claim 1 and further comprising:

a frog carried by the reciprocally movable conveyor bed on an upstanding side wall thereof proximate above the product transporting surface to operatively cooperate with the second end portion of the diverter arm when the second end portion of the diverter arm is adjacent the frog.

7. A product diverter as claimed in claim 1 and further comprising:

a bushing and a bushing support fixedly secured to an underside of the reciprocally movable conveyor bed, and the diverter arm pivot shaft extends therethrough and is rotatably supported by the bushing and the bushing support.

8. A product diverter as claimed in claim 1 and wherein the yoke further defines a medial space bounded by a first side of the yoke, a spaced apart second side of the yoke and a yoke base; and the first side of the yoke and the second side of the yoke each carry a positionally adjustable bumper that provides a means to adjust size of the air-gap between each bumper and the paddle.

9. A product diverter as claimed in claim 1 and wherein the actuator is releasably fixedly attached to the stationary base of the product moving apparatus with an actuator mounting bracket.

10. A product diverter as claimed in claim 1 and wherein the first end portion of the upper diverter arm is vertically offset from the spaced apart second end portion of the upper diverter arm.

11. A product diverter as claimed in claim 1 and wherein the pneumatic puck has a top surface, a bottom surface and an outwardly facing edge portion and the pneumatic puck is expandable responsive to receiving pneumatic pressure from the pneumatic source.

12. A product diverter as claimed in claim 1 and further comprising:

a cylinder piston operatively communicating with the pneumatic puck that is partially extended from the pneumatic puck responsive to the pneumatic puck receiving pneumatic pressure from the pneumatic source.

13. A product diverter as claimed in claim 1 and wherein responsive to a signal received from a controller, the diverter arm pivots to either the first position which directs product moving along the product transporting surface to a first destination, or the diverter arm pivots to the second position which directs product moving along the product transporting surface to a second destination, or the diverter arm is pivoted to a third position which directs product moving along the product transporting surface to both the first destination and the second destination.

14. A product diverter as claimed in claim 1 and further comprising:
   a controller in operative communication with the actuator and configured to send a signal to the actuator to control movement of the actuator.

15. An automated product diverter for a product moving apparatus having a stationary base, and a reciprocally movable conveyor bed having a product transporting surface with an upstream product receiving end and a downstream product discharge end, the product diverter comprising:
   an actuator releasably fixedly attached to the stationary base of the product moving apparatus by an actuator mounting bracket, the actuator having a rotatable actuator shaft carrying a lower diverter arm that extends radially outwardly from the rotatable actuator shaft, the lower diverter arm having a first end portion that is connected to the rotatable actuator shaft and a spaced apart second end portion that defines a yoke that further defines a medial space bounded by a first side of the yoke, a spaced apart second side of the yoke and a yoke base, the first side of the yoke and the second side of the yoke each carrying a positionally adjustable bumper that provides a means to adjust size of an air-gap between each bumper and a paddle carried by an upper diverter arm;
   the upper diverter arm has a first end portion and a spaced apart second end portion, and the second end portion is vertically offset from the first end portion, and the first end portion of the upper diverter arm is releasably fixedly interconnected to a diverter arm pivot shaft that is axially rotatably carried by a bushing and a bushing support that is fixedly secured to an underside of the reciprocally movable conveyor bed, and the diverter arm pivot shaft extends through the reciprocally movable conveyor bed so that a second upper end portion of the diverter arm pivot shaft, opposite the upper diverter arm extends through and is spacedly vertically above the product transporting surface of the reciprocally movable conveyor bed;
   the paddle is structurally interconnected to the second end portion of the upper diverter arm and has a generally planar first side and a generally planar second side and defines a peripheral edge extending thereabout and the paddle extends vertically downwardly from the second end of the upper diverter arm opposite the reciprocally movable conveyor bed so that the paddle is positioned within the medial space defined by the yoke and an air gap is maintained between each planar side, of the paddle and each bumper carried by the lower diverter arm yoke;
   a pivot shaft support is interconnected with the second upper end portion of the diverter arm pivot shaft and with an upper edge portion of a vertical support that has an opposing bottom edge portion that is fixedly attached to the product supporting surface of the reciprocally movable conveyor bed downstream of the diverter arm pivot shaft;
   a diverter arm is structurally interconnected with, and extends radially upstream from, an outwardly facing circumferential surface of the diverter arm pivot shaft that extends above the product transporting surface of the reciprocally movable conveyor bed, and the diverter arm has a first end portion that is structurally interconnected to the outwardly facing circumferential surface of the diverter pivot arm shaft and a spaced apart second end portion that extends upstream therefrom, and the diverter arm further has a first lateral side and an opposing second lateral side, a top edge and a bottom edge and a track is defined in the top edge of the diverter arm to carry a pneumatic line that pneumatically communicates between a pneumatic source and a pneumatic puck that is carried by a puck bracket on the top edge of the diverter arm adjacent the second end portion, and the pneumatic puck has a top surface, a bottom surface and an outwardly facing edge portion and the diverter arm moves between a first position and a second position as the diverter arm pivot shaft axially rotates responsive to actuation of the actuator,
   a diverter bridge that extends transversely across the reciprocally movable conveyor bed and is spacedly above the product transporting surface upstream of a pivot bridge and adjacent above the second end portion of the diverter arm as the diverter arm moves between the first position and the second position, the diverter bridge having a first end portion that is fixedly connected to one upstanding sidewall of the reciprocally movable conveyor bed with a conveyor bed connector, and a second end portion that is fixedly connected to a second upstanding sidewall of the reciprocally movable conveyor bed with a conveyor bed connector, the diverter bridge further having a top portion and a bottom portion defining a puck track, an upstream edge and a downstream edge, and the pneumatic puck carried at the second end portion of the diverter arm movably engages with the puck track defined in the bottom portion of the diverter bridge as the diverter arm moves between the first position adjacent the one upstanding sidewall of the reciprocally movable conveyor bed and the second position adjacent the second upstanding sidewall of the reciprocally movable conveyor bed responsive to axial rotation of the actuator shaft of the actuator and axial rotation of the diverter arm pivot shaft; and
   the diverter arm is positionally secured in the first position relative to the product transporting surface or in the second position relative to the product transporting surface by actuation of the pneumatic source which communicates with the pneumatic puck which responsively causes the pneumatic puck to expand and cause a cylinder piston to positionally secure the diverter arm relative to the diverter bridge and the product transporting surface of the reciprocally movable conveyor bed; and
   the lower diverter arm and the upper diverter arm are isolated from one another by the air gaps so that the reciprocal movement of the conveyor bed is not communicated to the lower diverter arm.

16. A product diverter as claimed in claim 15 and further comprising:
   a pivot bridge having a first end portion and a spaced apart second end portion, a top portion and an opposing bottom portion, an upstream edge and a downstream edge, the pivot bridge further has a pivot axle support post between the first end portion and the second end portion to carry a pivot shaft support that communicates with the upper end portion of the diverter arm pivot shaft, and the pivot bridge has a diverter vane adjacent downstream to the diverter arm pivot shaft that extends outwardly from the downstream edge of the pivot bridge generally along a longitudinal axis of the product transporting surface, and the pivot bridge is interconnected at the first end portion and at the second end portion with spaced upstanding sidewalls of the reciprocally movable conveyor bed.

17. A product diverter as claimed in claim 16 and wherein a pivot shaft support is spacedly above the product transporting surface of the reciprocally movable conveyor bed, and the pivot shaft support is carried on the pivot bridge that is spacedly above and extends transversely across product transporting surface of the reciprocally movable conveyor bed.

18. An automated product diverter as claimed in claim 15 and further comprising:
 a controller in operative communication with the actuator and configured to send a signal to the actuator to control movement of the actuator.

19. An automated product diverter for a reciprocally movable conveying device comprising;
 a stationary base;
 a reciprocally movable conveyor bed supported by the stationary base, the reciprocally movable conveyor bed having a product transporting surface with an upstream product receiving end and a downstream product discharge end, and two spaced apart upstanding sidewalls;
 a diverter arm having a first end portion and a second end portion and that is pivotally attached to the reciprocally movable conveyor bed by a vertically extending pivot shaft axle that extends through the product transporting surface and which interconnects with the first end portion of the diverter arm, and the second end portion of the diverter arm is positionally movable along the product transporting surface in an arc of travel between the two spaced apart upstanding sidewalls, and the reciprocal movement of the conveyor bed is communicated to the diverter arm;
 an actuator carried by the stationary base that operatively communicates with the pivot shaft axle to operatively pivot the diverter arm in the arc of travel; and
 the actuator is isolated from the reciprocal movement of the diverter arm so that the actuator does not reciprocally move responsive the diverter arm or conveyor bed.

20. An automated product diverter as claimed in claim 19 and further comprising:
 a controller in operative communication with the actuator and configured to send a signal to the actuator to control movement of the actuator.

* * * * *

UNITED STATES PATENT AND TRADEMARK OFFICE
CERTIFICATE OF CORRECTION

PATENT NO. : 10,850,930 B1  
APPLICATION NO. : 16/452718  
DATED : December 1, 2020  
INVENTOR(S) : Thaddeus Hicks et al.

Page 1 of 1

It is certified that error appears in the above-identified patent and that said Letters Patent is hereby corrected as shown below:

In the Specification

Column 5: Line 35: Delete the word "am" and insert the word --arm--.

Column 10: Line 35: Delete the word "and" and insert the word --end--.

Column 10: Line 62: Delete the number "156" and insert the number --155--.

Column 11: Line 2: Delete the word "am" and insert the word --arm--.

Column 12: Line 20: Delete the word "an" and insert the word --a--.

Column 12: Line 58: Delete the word "vibrational" and insert the word --vibrationally--.

Column 16: Line 22: Delete the word "am" and insert the word --arm--.

Column 16: Line 47: Delete the word "the".

In the Claims

Column 20: Line 18: in Claim 15, Delete the word "a" and insert the word --the--.

Column 20: Line 36: in Claim 15, Delete the word "the" and insert the word --a--.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*